United States Patent [19]

Schumacher et al.

[11] Patent Number: 5,146,104

[45] Date of Patent: Sep. 8, 1992

[54] ELECTRONIC DEVICE FOR TRIGGERING A SAFETY DEVICE

[75] Inventors: Hartmut Schumacher, Freiberg; Norbert Crispin, Markgroeningen; Bernhard Mattes, Sachsenheim, all of Fed. Rep. of Germany

[73] Assignee: Robert Bosch GmbH, Stuttgart, Fed. Rep. of Germany

[21] Appl. No.: 466,393

[22] PCT Filed: Aug. 22, 1989

[86] PCT No.: PCT/EP89/00996

§ 371 Date: Apr. 25, 1990

§ 102(e) Date: Apr. 25, 1990

[87] PCT Pub. No.: WO90/02062

PCT Pub. Date: Mar. 8, 1990

[30] Foreign Application Priority Data

Aug. 26, 1988 [DE] Fed. Rep. of Germany ....... 3828950
Sep. 9, 1988 [WO] PCT Int'l Appl. PCT/EP88/00820
Aug. 2, 1989 [DE] Fed. Rep. of Germany ....... 3925594

[51] Int. Cl.[5] .......................... B60R 21/32; F23Q 7/00
[52] U.S. Cl. .................................... 307/10.1; 361/251; 280/735
[58] Field of Search ............... 280/735; 180/281, 282, 180/274; 340/436, 438; 307/10.1; 364/424.05; 361/251

[56] References Cited

U.S. PATENT DOCUMENTS

| 3,622,974 | 11/1971 | Best et al. | 340/53 |
|---|---|---|---|
| 3,629,816 | 12/1971 | Gillund | 340/61 |
| 3,633,159 | 1/1972 | Dillman et al. | 340/52 H |
| 3,668,627 | 6/1972 | Brainerd | 340/52 H |
| 3,714,627 | 1/1973 | Dillman et al. | 340/52 H |
| 3,745,523 | 7/1973 | Lewis et al. | 340/52 R |
| 3,757,697 | 9/1973 | Phinney | 361/251 X |
| 3,870,894 | 3/1975 | Brede et al. | 307/9 |
| 4,158,191 | 6/1979 | Rogers . | |
| 4,346,913 | 8/1982 | Schrauf et al. | 280/735 |
| 4,366,465 | 12/1982 | Veneziano | 340/52 R |
| 4,410,875 | 10/1983 | Spies et al. | 340/52 H |
| 4,614,876 | 9/1986 | Mattes et al. | 307/10 SB |
| 4,641,041 | 2/1987 | Mattes et al. | 307/10 R |
| 4,673,912 | 6/1987 | Kumasaka et al. | 280/735 X |
| 4,700,263 | 10/1987 | Marshall et al. | 361/251 |
| 4,701,628 | 10/1987 | Kumasaka et al. | 307/9 |
| 4,835,513 | 5/1989 | McCurdy . | |
| 4,845,377 | 7/1989 | Swart | 280/735 X |
| 4,864,202 | 9/1989 | Nitschke et al. | 280/735 X |
| 4,893,109 | 1/1990 | Vrabel et al. | 280/735 X |
| 4,933,570 | 6/1990 | Swart et al. | 307/10.1 |

FOREIGN PATENT DOCUMENTS

| 0283737 | 9/1988 | European Pat. Off. . |
|---|---|---|
| 0284728 | 10/1988 | European Pat. Off. . |
| 2217030 | 11/1972 | Fed. Rep. of Germany . |
| 3412798 | 10/1985 | Fed. Rep. of Germany . |
| 3506487 | 9/1986 | Fed. Rep. of Germany . |

Primary Examiner—A. D. Pellinen
Assistant Examiner—Fritz M. Fleming
Attorney, Agent, or Firm—Kenyon & Kenyon

[57] ABSTRACT

An electronic device for triggering safety devices 10 comprises a firing element ZP which is connected in series to a capacitor ZK. The firing element ZP is acted upon by currents from controllable current sources IQ1, IQ2, which, in accordance with an output signal of a sensor S, are triggered by an evaluation circuit AS.

30 Claims, 5 Drawing Sheets

FIG. 7
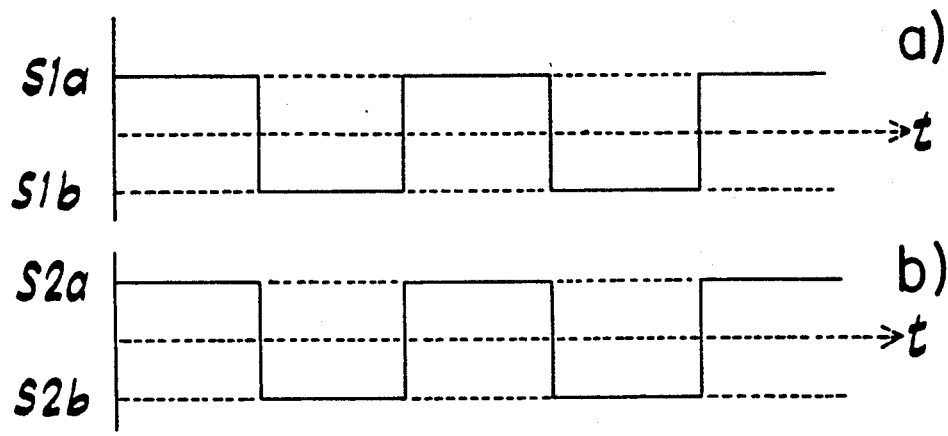
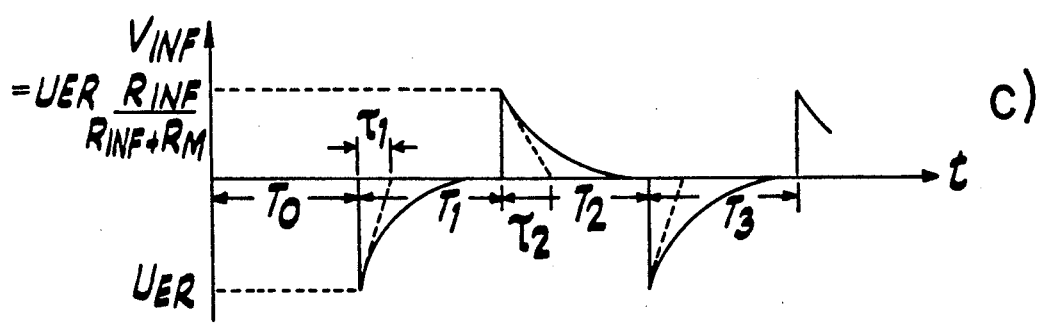
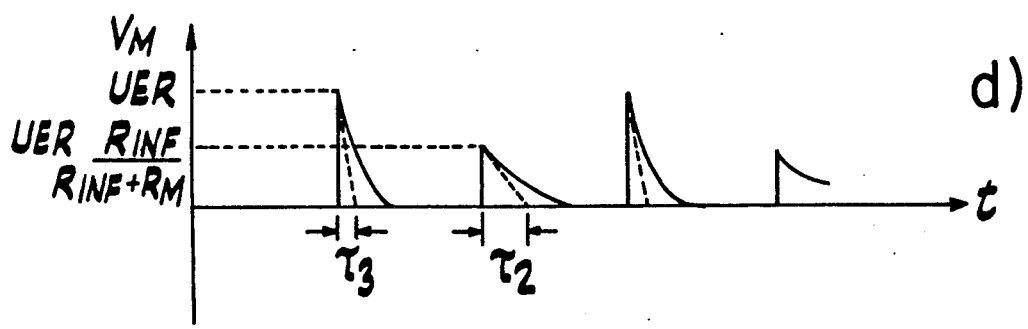

ELECTRONIC DEVICE FOR TRIGGERING A SAFETY DEVICE

BACKGROUND OF THE INVENTION

The present invention is directed to an electronic device used to trigger a safety device such as an inflatable retention device for use in a motor vehicle.

A device of the above-described type is known from 1141 *Ingenieurs de l'Automobile* (1982) No. 6, pp 69 to 77. It is of significant importance for electronic devices of this type that all structural elements, which are critical for the functioning of the device, be able to be tested. Only in this way can one ensure a high degree of operational reliability, which is necessary for safety devices of this type. From DE-A 22 22 038, it is known, in testing the firing element of such a device, to connect a constant-current source to the firing element and to provide a differential connection for measuring the voltage drop across the firing element. This approach requires additional switching devices, which are provided for testing purposes, apart from the triggering means of the firing elements. Furthermore, a disadvantage of the known devices is that the firing elements are connected in a two-pole fashion, with power output stages applied to them, so that the danger of unintentionally activating the firing elements as, for example, during testing or assembly work cannot be completely ruled out. Finally, it is only possible to test the output stages controlling the firing elements with the use of an additional mechanical switch, which disconnects the power outputs from the electric power supply under normal operating conditions, as, for example, when there is no imminent danger. The ON state of this mechanical switch, however, cannot be easily checked.

SUMMARY OF THE INVENTION

The device according to the present invention includes a firing element and a capacitor coupled in series to the firing element. The series coupled capacitor provides numerous advantages over known electronic devices. For example, the capacitor can have a capacitance value that is of a relatively small value such that the electric charge that can be stored in the series coupled capacitor is not adequate to provide an amount of energy sufficient to trigger the firing device. Thus, the direct application of a direct voltage, for example the supply voltage of the vehicle, to the firing lines leading to the firing element cannot lead to an unintentional triggering of the firing element. This cannot be ruled out in the case of previous devices. Since either the firing element itself or the capacitor connected in series to the firing element is connected on one side to the ground connection, a firing of the firing element is brought about via only one single firing line. This reduces the costs for cable connections as well as the contact resistances in the firing circuit, decreases the number of required electrical connections to the evaluation circuit and on the whole increases the operational reliability, since the number of lines that could be damaged is reduced. The device according to the present invention is also distinguished by the fact that push-pull operated current sources are used to control the firing element. They can be set to specific, predetermined current values by means of an evaluation circuit. The push-pull operation increases the functioning security of the device to prevent any false tripping of the firing element in case of a malfunction of the electronic device, since a one-sided or asymmetrical control by only one current source in the long run cannot lead to an unintentional triggering of the firing element. An intentional firing of the firing element is only possible by means of a repeated, consecutive triggering of the current source in the push-pull operation.

Now if the triggering rhythm of the current sources should also be disturbed as the result of a very improbable type of malfunction, in the case of the device according to the present invention, an erroneously initiated firing operation can still be stopped before the triggering of the firing element. On the other hand, in the case of the prior art, an activation of the firing element leads irreversibly to its triggering. Finally, when no measurements or tests are carried out on the firing circuit containing the firing element and on the output stages applied to the firing element, a current source applied to the firing element can be constantly conductively-controlled. This results in the low-resistance deactivation of the firing element. In this manner, one is able to considerably increase the reliability of the device according to the present invention to thereby protect against electromagnetic disturbances, particularly against an unintentional triggering of the firing element by means of electromagnetic disturbances.

BRIEF DESCRIPTION OF THE DRAWINGS

Exemplified embodiments of the invention are depicted in the drawings and explained more closely in the following description.

FIG. 6a to 6d and FIG. 7a to FIG. 7d depict timing diagrams in connection with the exemplified embodiment according to FIG. 5.

DETAILED DESCRIPTION

An electronic device for triggering safety devices for vehicle occupants comprises an acceleration-sensitive sensor S, which is connected to an evaluation circuit AS. The electronic device also comprises a firing element ZP, which is preferably a "primer capsule". A primer capsule comprises, for example, a resistance wire connected to a pyrotechnic chain, which can be activated by the development of heat resulting from the current flow. The primer capsule ZP, on its part, is connected to a safety device 10, for example an inflatable air bag. To supply current to the electronic device, a switching controller SR is provided, whose input connection is connected to the voltage supply of the vehicle UB. The output connection of the switching controller is connected via a diode D2, which is polarized in the conducting direction, to an energy reserve ER in the form of a capacitor having a large capacitance. Parallel to the energy reserve ER, a relatively highly resistive resistor R1 is connected to ground. The series connected structural elements diode D1 and resistor R4 are mounted parallel to the series connection of the switching controller SR and the diode D2. The cathode of the diode D2 is connected to the input connection of a first controllable current source IQ1, whose output connection is connected via the firing line ZL to the first terminal connection of the firing element ZP. The second terminal connection of the firing element ZP is connected to the first terminal connection of a capacitor ZK, whose second terminal connection is connected to the ground connection E. A second controllable current source IQ2 is connected in parallel to the series connection of the firing element ZP and the capacitor ZK. The evaluation circuit AS is connected via control lines SL1, SL2, SL3 to the switching controller SR, the first controllable current source IQ1 and the second controllable current source IQ2. Connecting line UL1 leads from the interconnection point between the cathode of the diode D2 and the positive connection of the energy reserve ER to the evaluation circuit AS. Connecting line UL2 leads from the firing line ZL to the evaluation circuit AS.

Figure 1:
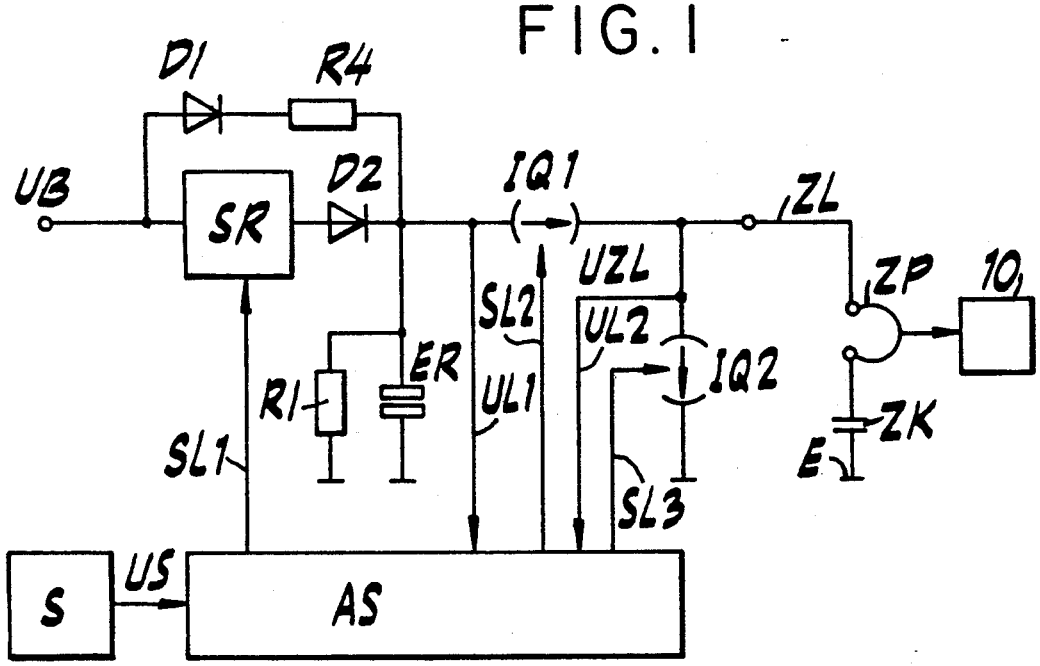
FIG. 1 depicts a circuit diagram of an exemplified embodiment of the electronic device.

The electric power supply of the electronic device according to FIG. 1 comprises the switching controller SR, which is connected on the input side to the operating voltage source UB, for example to the vehicle electrical system of a vehicle, and which re-charges the capacitance provided as an energy reserve ER to a higher voltage UER than the operating voltage UB. It is expedient for the voltage UER to lie at a level that is approximately two times that of the operating voltage UB. The diodes D1 and D2 are decoupling diodes, which increase security, for example against erroneous polarization. After a breakdown of the switching controller SR, at the least, the operating voltage UB on the energy reserve ER is still available across the diode D1 and the resistor R4. R1 is a highly resistive discharge resistor, which can serve to monitor the energy reserve ER if the switching controller SR is blocked. By measuring the discharge current through the resistor R1, it is easily possible to constantly test the energy content of the energy reserve ER. IQ1 is a first controllable current source, which, when controlled by the evaluation circuit AS, delivers current for firing and testing the firing element ZP in the forward direction, in other words out of the firing line ZL into the firing element ZP. IQ2 is a second current source or current sink that is controlled by the evaluation circuit AS and which picks up a current flowing back from the firing element ZP into the firing line ZL. The evaluation circuit AS evaluates the output signal US of the acceleration-sensitive sensor S and decides if the firing element ZP is to be triggered in the case of an expected accident situation. The firing element ZP, in turn, activates the retention means 10 to protect the passengers. The sensor S detects the acceleration acting on the vehicle and emits, for example, an acceleration-proportional output signal US. The evaluation circuit AS also controls the switching controller SR via the control line SL1, so that this switching controller SR either finds itself in a blocking state or it converts the operating voltage UB into a higher voltage UER. The evaluation circuit AS also controls the first controllable current source IQ1 via the control line SL2, so that this current source IQ1 either blocks or supplies test current or igniting current for testing or firing the firing element ZP. Via the control line SL3, the evaluation circuit AS controls the second controllable current source (current sink) IQ2 in such a way, that it either blocks or picks up the test current flowing in the reverse direction, in other words out of the firing element ZP into the firing line ZL. The evaluation circuit AS also detects the voltage UER on the energy reserve ER via the line UL1 to constantly monitor the state of charge of the energy reserve ER and to determine its energy content and also to determine the maximum available igniting voltage for the firing element ZP. The evaluation circuit AS also monitors the voltage UZL on the firing line ZL by means of the line UL2, in order to monitor in this manner the resistance of the firing circuit, which is composed of the resistance of the firing element ZP itself and the resistance of the firing line ZL. Furthermore, the monitoring of the voltage UZL serves to determine the capacitance value of the capacitor ZK and to test the function of the controllable current sources IQ1 and IQ2.

Figure 2:
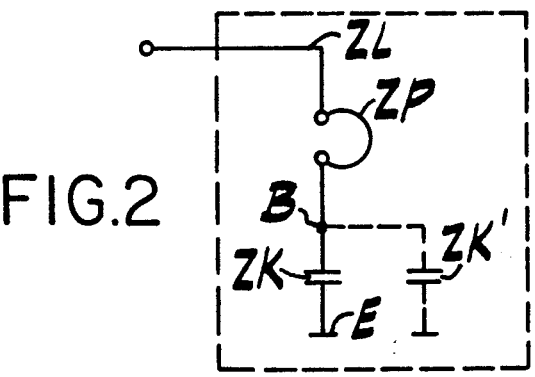
FIG. 2 illustrates a circuit detail of the circuit diagram according to FIG. 1.

There are two alternatives for the series connection of the firing element ZP with the capacitor ZK. They are depicted in the circuit extracts according to FIG. 2 and FIG. 3. FIG. 2 essentially corresponds to the circuit of the firing element ZP according to the circuit diagram of FIG. 1. Therefore, in this case, a terminal connection of the firing element ZP is connected to the firing line ZL and the other terminal connection of the firing element ZP is connected to a terminal connection of the capacitor ZK, whose second terminal connection is connected to the ground connection E. A second capacitor ZK' provided, for example for redundancy reasons, is also drawn with a dotted line in FIG. 2.

Figure 3:
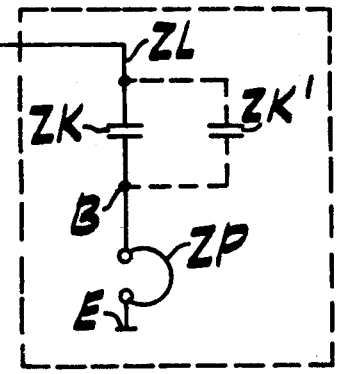
FIG. 3 shows a circuit detail of another exemplified embodiment of the electronic device.

In the case of another exemplified embodiment of the invention according to FIG. 3, a terminal connection of the firing element ZP is connected to the ground connection E, while the second terminal connection of the firing element ZP is connected to the first terminal connection of the capacitor ZK, whose second terminal connection leads to the firing line ZL. In this case as well, a capacitor ZK' drawn with a dotted line is switched in parallel to the capacitor ZK and is provided again possibly for redundancy reasons. Both design variants according to FIG. 2 and FIG. 3 are distinguished advantageously in that contrary to the solutions known from the prior art, a direct application of a direct voltage, for example the supply voltage UB, on the firing lines cannot lead to an unintentional tripping of the firing element ZP.

The arrangement of the firing element ZP and the capacitor ZK according to the exemplified embodiment of FIG. 2 is further distinguished in that in the case of a short circuit of the firing element ZP at point B to the ground connection E, it is still possible to ignite the firing element ZP in case of a crash. However, if such an error should occur, one can no longer prevent an unintentional application of a direct voltage to the firing line leading to the firing element ZP from producing a false tripping, in other words an ignition of the firing element ZP.

To simplify the representation, only one firing element ZP and one retention means 10 are depicted in the circuit diagrams according to FIG. 1, FIG. 2 and FIG. 3. From the evaluation circuit AS, it is of course possible to trigger several firing elements ZP, which in turn activate several retention means 10. For example, the retention means 10 comprise at least an air bag for the driver of the vehicle and a belt tightener and/or air bag for the front-seat passenger or belt tightener for all passengers of the vehicle.

The capacitance value of the capacitor ZK is expediently dimensioned so small, that the charge Q which can be stored in the capacitor ZK is not sufficient to activate the firing element ZP. Thus in a preferred exemplified embodiment of the invention, the capacitance value of the capacitor ZK lies more or less under 10 microfarad, and particularly at approximately 1 to 3 microfarad. As a result of this type of dimensioning of the capacitor ZK, only the energy E', which lies below the amount of energy required for the firing, is fed respectively to the firing element ZP at each triggering of the controllable current sources IQ1, IQ2. Only a repeated supply of quantities of energy E' to the firing element ZP leads to its activation. Capacitors with capacitance values of the mentioned order of magnitude are comparatively small spatially and are therefore able to be expediently combined with the firing element ZP itself to form one firing structural element 28 that can be mounted cost-effectively.

Figure 5:
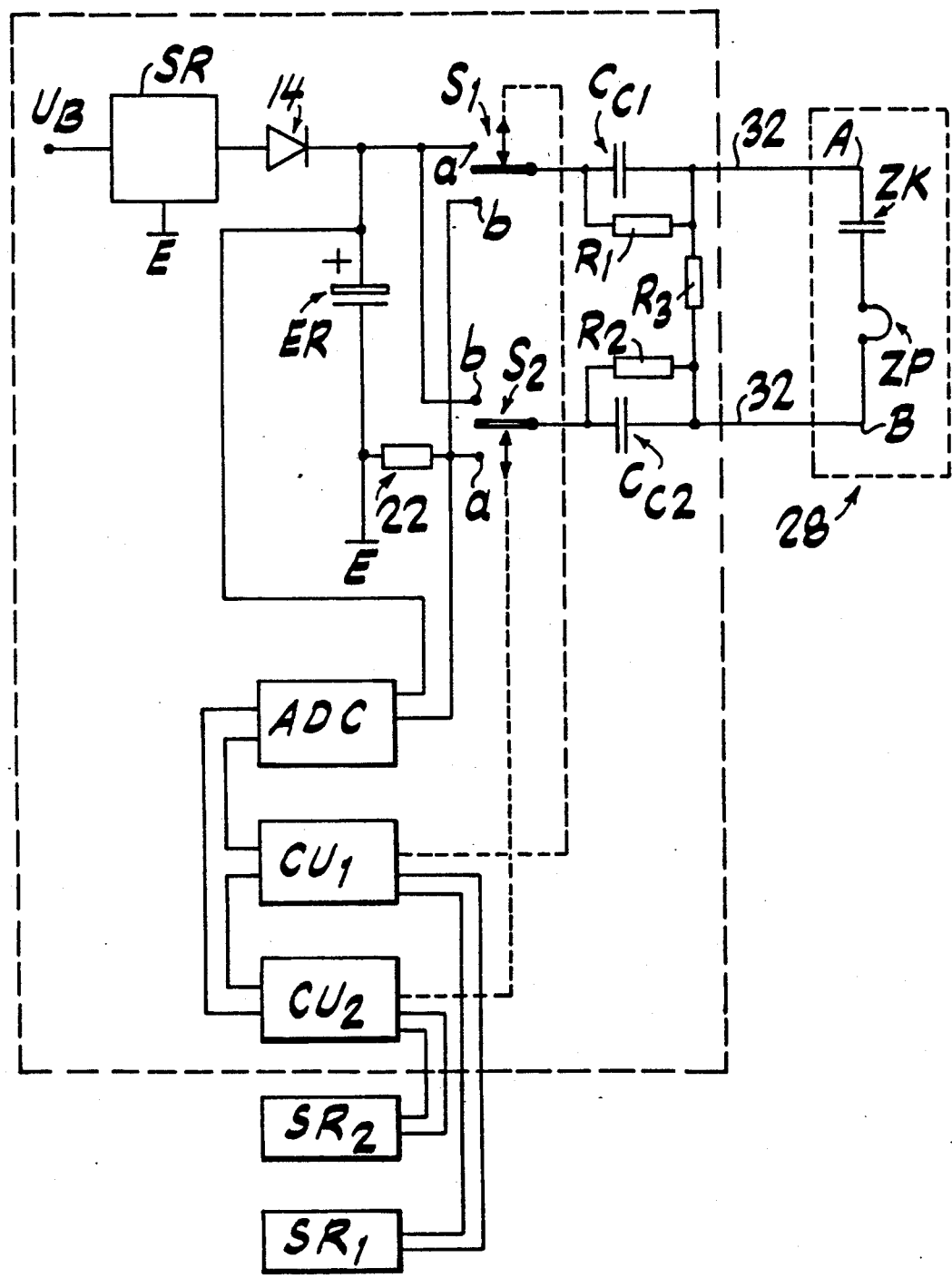
FIG. 5 shows a further exemplified embodiment of the invention that includes an analog-digital converter.

In the exemplified embodiment according to FIG. 5, the operating voltage UB is supplied via a switching controller SR and a diode 14 polarized in the forward direction to a capacitor provided as an energy reserve ER. This capacitor is re-charged by the switching controller SR to a voltage that amounts to approximately twice the operating voltage UB. One of the terminal connections of the energy reserve ER is connected to each of switches S1, S2 at terminal connections a, b respectively of switches S1, S2, and to a terminal connection of an analog-digital converter ADC. The other terminal connection of the energy reserve ER is connected on the one side to the ground connection E and on the other side via a measuring shunt resistor 22 to a further input connection of the analog-digital converter ADC, as well as to further switching connections a, b of the switches S1, S2 as illustrated. The switches S1, S2 form one part of a circuit that has a firing structural element 28, whereby each switch S1, S2 is connected to the firing structural element 28 via a coupling capacitor C1, C2. Each coupling capacitor C1, C2 is shunted by a highly resistive resistor R1, R2, while the firing structural element 28, in turn, is shunted by a highly resistive resistor R3. The firing structural element 28 comprises a primer capsule ZP, which is connected in series to a capacitor ZK. As shall be explained later in greater detail, the switches S1, S2 are provided to reverse the polarity of the firing structural element 28, whereby the switches are actuated simultaneously and in this manner activate the primer capsule ZP, which in turn ignites a gas generator and, in this manner, inflates an air bag. The highly resistive resistors R1, R2 and R3 serve to discharge the capacitors C1, C2, ZK, when the device is not operational. The analog-digital converter ADC monitors the firing structural element 28, as well as the firing lines 32, which connect the firing structural element to the triggering circuit, as well as the switches S1, S2, in that the voltage drop across the measuring resistor 22 is measured. The digital output signal of the analog-digital converter ADC is supplied to each of two available control units CU1, CU2, whereby the last-mentioned control unit CU2 is also supplied with a digital output signal of the first-mentioned control unit CU1.

The functioning method of the electronic device according to FIGS. 1 to 3 is clarified in the following, also with reference to the pulse characteristics depicted in FIG. 4. The pulse diagrams are simplified representations, wherein the influence of circuit inductances has not been considered and the voltage UER on the energy reserve ER is assumed to be constant.

Figure 4:
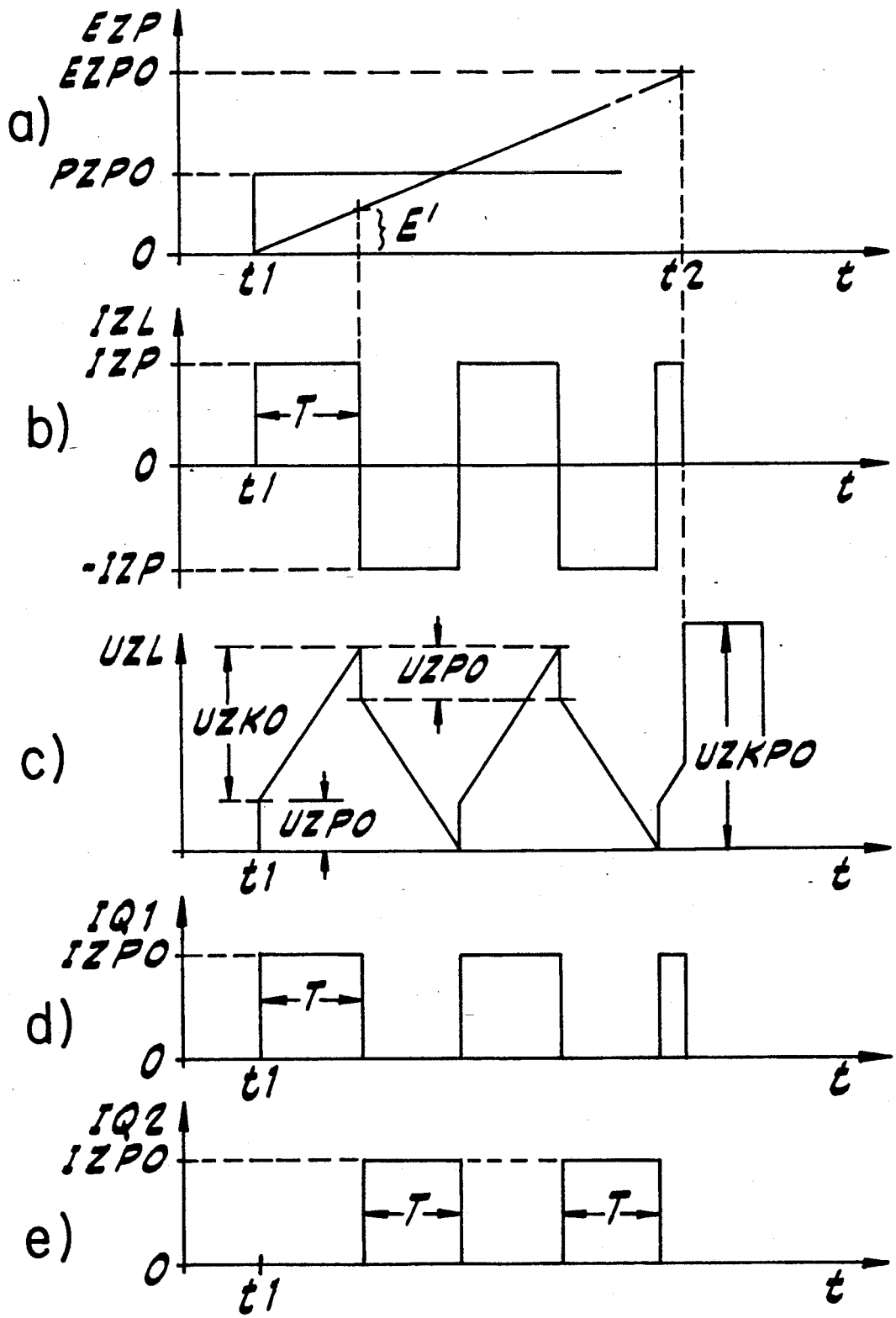
FIG. 4a to 4e depict various timing diagrams in connection with the circuit diagram according to FIG. 1 to FIG. 3.

The following functional connections are depicted in detail in FIG. 4:

FIG. 4a shows the energy EZP supplied to the firing element as a function of time. FIG. 4b depicts the current IZL on the firing line ZL as a function of time. FIG. 4c illustrates the progression of the voltage UZL on the firing line ZL as a function of time. FIG. 4d depicts the characteristic of the current of the controllable current source IQ1 as a function of time, and FIG. 4e shows the characteristic of the current of the controllable current source IQ2 as a function of time.

One assumes here that after evaluating the output signal US of the sensor S, the evaluation circuit AS recognizes an impending accident situation and issues a firing command at the instant t1 for the firing element ZP. As a result, the controllable current source IQ1 is triggered in a timed fashion via the control line SL2 in such a way that the current source transmits pulse-shaped current pulses of the duration T to the firing line ZL, as depicted in FIG. 4d. Via the control line SL3, the controllable current source IQ2 is triggered further by the evaluation circuit AS in such a way that it picks up pulse-shaped current from the firing line ZL according to the representation of FIG. 4e. The current sources IQ1 and IQ2 thus work in push-pull operation and are each conductive in turn for the duration T, so that all in all the current characteristic depicted in FIG. 4d results on the firing line ZL. The duration T of the current flow of the individual current pulses is selected expediently, so that only the energy E' is supplied respectively to the firing element ZP. This energy E' is considerably less than the firing energy EZPO required for firing the firing element ZP. As apparent from FIG. 4a, the firing energy EZP supplied to the firing element ZP rises linearly with time, independently of the respective existing current direction according to the representation of FIG. 4d. The invention is based here on the fact that the Joule heat supplied to the firing element ZP, when the current passes through this firing element, is essentially independent of the current direction. The minimum energy EZPO necessary for firing the firing element ZP would be supplied to the firing element ZP at the instant t2. The evaluation circuit AS detects via the line UL2 the voltage UZL across the firing line ZL (compare representation in FIG. 4c) and determines from this voltage characteristic, while knowing of the current characteristic according to FIG. 4b, both the ohmic resistance of the firing circuit as well as the capacitance value of the capacitor ZK. Furthermore, the firing instant of the firing element is able to be exactly recognized from the voltage characteristic UZL (FIG. 4c). If the firing takes place namely while the controllable current source IQ1 is triggered via the control line SL2, then the voltage on the firing line ZL assumes a maximum value, in case the firing element ZP, as a result of its destruction in case of a firing, interrupts the firing circuit, and for that reason the current source IQ1 goes into saturation. Even when a short circuit occurs in rare cases, as the result of the firing operation in the firing element ZP, this can be recognized by the evaluation circuit AS in light of the voltage characteristic (FIG. 4c). If the firing of the firing element takes place while the controllable current source IQ2 is triggered via the control line SL3, then the current source IQ2 goes into saturation when the firing element is disconnected. The voltage across the firing line ZL then falls to the low saturation voltage of the current source IQ2.

Based on the pulse diagrams of FIG. 4, only a principal exemplified embodiment of the invention is clarified, which is distinguished by the fact that the firing operation of the firing element ZP proceeds by means of a repeated triggering of the current sources IQ1, IQ2 in push-pull operation for respectively short and equally long pulse times T. It lies within the scope of the invention, to select from these, in case of need, varying triggering times for the current sources IQ1 and IQ2, which for example can also turn out to be of different lengths. Furthermore, the current sources IQ1 and IQ2 can also be set to different current values by the evaluation circuit AS in case of a triggering [operation]. Finally, it can also be useful for purposes of testing the firing element and the entire firing circuit, to trigger the current sources IQ1, IQ2 so that they overlap in time.

Provided that no measurements or tests are to be carried out on the firing element ZP, the firing circuit and/or the current sources IQ1, IQ2 triggering the firing element ZP, the current source IQ2 can be expediently controlled in a continuous, conductive manner in a condition of service readiness, through which means the firing element ZP is shut off in a low-resistance manner. This results in the firing element ZP being considerably less susceptible to electromagnetic irradiation from electric devices in the vehicle itself or also from the environment. Thus the operational safety and reliability of the electronic device is greatly improved.

As revealed in the pulse diagrams of FIG. 4, particularly of FIG. 4a and FIG. 4b, to have a successful firing operation of the firing element ZP at the instant t2, a repeated, successive triggering of the current sources IQ2, IQ1 is necessary by means of the evaluation circuit AS in push-pull operation for respectively short pulse widths T. Now, if this process that is based on an exact observance of the control rhythm of the current sources IQ1, IQ2 should also be disturbed due to a very rare error, then the device according to the invention, contrary to known technological solutions, also permits a firing operation that has already been commanded to still be interrupted, before the firing element ZP is actually fired. This is possible due to the fact that in the exemplified embodiment described above, the firing energy is only supplied to the firing element during the firing operation in a timed, quantitatively regulated fashion, so that the firing element is not suddenly tripped after a firing command has been given, but rather the firing element is only tripped after an exactly stipulated firing delay time.

If, for example, one selects a millisecond for the firing delay time, which corresponds to the time interval t2 minus t1 according to FIG. 4a, then control means within the evaluation circuit AS have enough time to restore to a specific status, by means of a reset operation, any circuits that have possibly gotten out of control in the evaluation circuit AS and to break off the firing of the firing element ZP that had been commanded in an uncontrolled fashion. In retention systems known from prior art, on the other hand, the firing of a firing element ZP is irreversible after a firing command has been given. This means that, provided that the firing circuit is not closed, the firing command automatically leads to a tripping of the firing element. This is what occurs, unless it is still guaranteed in the case of an unintentionally given firing command, that the firing circuit is not closed as the result of an additional, mechanically functioning and acceleration-dependent switch in the firing circuit. The excellent reliability of the solution according to the invention makes it possible to do without these types of mechanical switches in the firing circuit.

Their operativeness in the vehicle cannot be periodically tested. Therefore, in the case of a non-redundant design, this presents a great risk for the readiness, particularly for the tripping capability, in an accident situation. The refinement of the electronic device according to the invention in the form of a firing element, that is connected in series to a capacitor, and the triggering of this firing element via current sources in push-pull operation, permits a periodic testing of all structural elements This is necessary to enable the firing circuit to function correctly and, contrary to prior art, does not necessitate additional structural elements for testing purposes.

In previously known electronic retention systems, many additional structural elements, which for example feed auxiliary currents into the firing circuit, are required on the firing circuit solely to monitor the electrical resistance of the firing element Since, however, in this case, different structural elements must be provided for the testing operation, on the one hand, and for the firing operation, on the other hand, the result is an extremely high degree of complexity and a decline in the reliability of the entire system.

A further advantage of the device according to the invention lies in the fact that even a potential difference between the ground connection of the evaluation circuit AS and the ground connection of the firing element does not have a disturbing effect on the firing and testing operations. Although in the exemplified embodiment according to FIGS. 1-3 two current sources IQ1, IQ2 are provided for the firing and testing of the firing circuit and only the voltage UZL on the firing line ZL is detected as a measured variable, the following conditions or structural elements are able to be easily tested: the functioning capability of the controllable current sources IQ1, IQ2; the short circuit of the firing element ZP with respect to the positive terminal connection of the voltage supply line or with respect to ground; the defectiveness of the resistance value of the firing element ZP, the defectiveness of the capacitance value of the capacitor ZK in the firing circuit; the interruption of the firing line ZL; the potential difference between the ground connection of the evaluation circuit AS and the ground connection of the firing element ZP.

Furthermore, the firing instant of the firing element ZP is able to be exactly determined when a firing operation has already been started, whether there has been interruption or a short circuit of the firing element. This is particularly advantageous, because after a firing has been recognized, the energy supply to the firing element ZP can be immediately adjusted. This is very significant for a reliable functioning of retention systems that have several retention means, which might have to be triggered in a chronological sequence, since for example, only a limited amount of energy is available in the energy reserve ER after a separation from the operating voltage UB has taken place.

By designing the output stages triggering the firing elements ZP as current sources IQ1, IQ2, the further advantage results that in case there is a short circuit of the firing element ZP to ground or to the positive pole of the supply voltage, the output stages cannot be damaged. Furthermore, contrary to the previously known electronic devices, no uncontrollably high current flows develop when the firing element is triggered. This has the particular advantage that narrower circuit-board conductors which save more space can be selected for the printed circuits, so that all in all a space-saving configuration is produced. The timed triggering of the current sources IQ1, IQ2 also contributes to this end, since smaller structural element forms are able to be selected that only have to be designed for a fast pulse operation and not for continuous stress.

Figure 6:
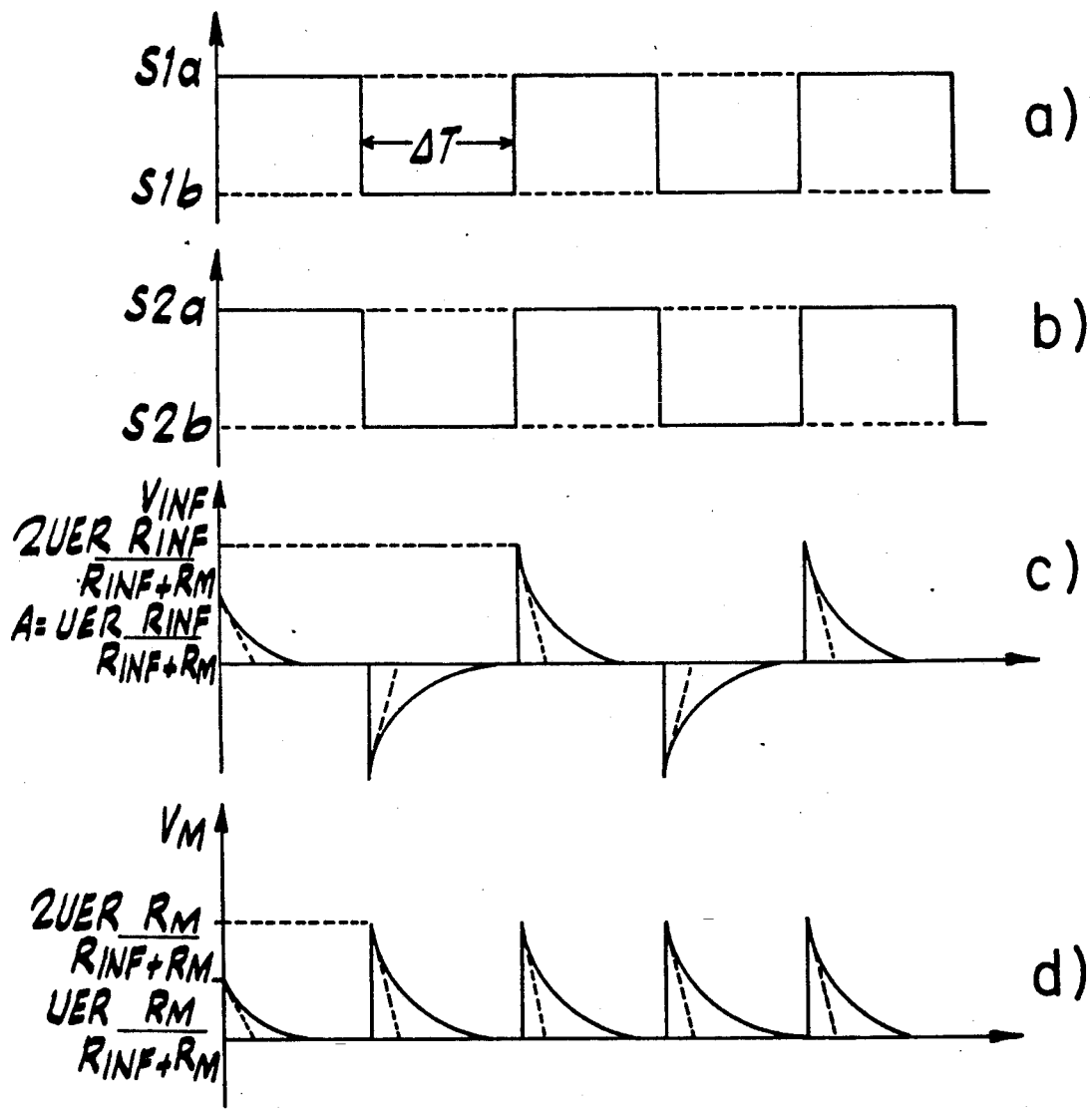

The functioning method of the exemplified embodiment according to FIG. 5 is clarified in the following with reference to FIG. 5 as well as with reference to the pulse diagrams of FIG. 6a) to d) and FIG. 7a) to d). Each control unit CU1, CU2 receives output signals of the sensor SR1, SR2 assigned to it. These sensors detect signals, preferably acceleration signals of the vehicle along defined sensitivity axes, based on which one can determine if an accident situation is at hand. An accident situation is assumed, for example, when the acceleration value along a defined sensitivity axis exceeds a defined limiting value. The control units CU1, CU2 continuously monitor the output signals of the sensors SRI, SR2 and determine, by evaluating these sensor signals, if an accident situation is at hand. When the output signals of the sensors SRI, SR2 are such that one must infer an accident situation, the control unit CU1 actuates the switch S1, while at the same time the other control unit CU2 actuates the switch S2. This is clarified based on the pulse diagrams of FIG. 6a) and FIG. 6b), which depict the circuit state of the switches S1 and S2. As a result of these switching operations, according to FIG. 6c), a voltage pulse VINF is generated on the primer capsule ZP, and in fact for the duration of a time interval $\Delta T$, while the two switches S1, S2 are actuated simultaneously. The peak value of this voltage pulse VINF results as follows:

$$VINF = 2UER \frac{RINF}{RINF + RM}$$

wherein, RINF is the resistance value of the primer capsule ZP and UER is the voltage on the energy reserve ER. Of course, the initial voltage pulse is only about half as large. The peak value of the quantity of energy that is supplied to the primer capsule ZP then results as $$PINF = 4U^2ER \frac{RINF}{(RINF + RM)^2}$$

Therefore, resulting as the quantity of energy, which is supplied to the primer capsule ZP per time interval $\Delta T$, when the switches S1, S2 are switched over, is:

$$\int_{\text{Beginning of the cycle of operation}}^{\text{End of the cycle of operation}} \left[ 4U^2ER \cdot \frac{RINF}{(RINF + RM)^2} \cdot e^{-2t/\tau} \right] dt$$

For UER $\approx$ constant (results when CER>>ZK) and for $\Delta T >> \tau$ (for example $\Delta T = 5\tau$), the following approximation applies:

$$\Delta E = 2\tau (UER)^2 \frac{RINF}{(RINF + RM)^2}$$

With $\tau = (RINF + RM) \cdot CTOT$ (CTOT = total capacitance)

$$E = 2CTOT \cdot UER^2 \frac{RINF}{RINF + RM}$$

$$= \frac{2CF(CC/2)}{CF + (CC/2)} \cdot UER^2 \cdot \frac{RINF}{RINF + RM}$$

With CTOT$\approx$CF (thus CC>>CF), the following approximation applies:

$$E = 2CF (UER)^2 \cdot \frac{RINF}{RINF + RM}$$

Thus within each time interval $\Delta T$, during which the switches S1, S2 are closed at the same time, an established quantity of energy $\Delta E$ results, which is supplied to the primer capsule ZP. When the entire quantity of energy supplied to the primer capsule ZP has exceeded the energy value required to trip the firing operation, the primer capsule is activated. In the end, as already described, this causes the air bag to be released.

As already mentioned, based on the exemplified embodiments explained before, however, the length of the time interval $\Delta T$ of the triggering phase and the quantity of energy $\Delta E$ supplied to the primer capsule during each triggering phase are dimensioned so that the quantity of energy supplied during the triggering phase (time interval $\Delta T$) of the primer capsule ZP is not sufficient to achieve the energy value necessary to trip the firing operation of the primer capsule ZP. The length of the time interval $\Delta T$ is also expediently selected to be short enough, so that as many energy installments $\Delta E$ as possible are supplied in order to achieve the energy value necessary to trip the firing operation. An exceptionally important aspect for the reliability of the device is the fact that, by means of the previously described, expedient dimensioning of the energy amount $\Delta E$ and of the time interval $\Delta T$, a firing operation can still be interrupted, even after it has already been started. If, for example, both control units CU1 and CU1 have established at the same time that it is necessary to trigger the primer capsule ZP, both switches S1 and S2 are actuated simultaneously and an energy pulse is fed to the primer capsule ZP. If however now, before the firing energy value required to trip the firing operation of the primer capsule ZP is reached, at least one of the two control units CU1, CU2 should determine that it is no longer necessary to trigger the primer capsule ZP, then a system error has possibly occurred or the critical sensor output signals of the sensors SR1, SR2 were only of a temporary nature. Both situations mean that it is no longer necessary to activate the primer capsule ZP. In this case, the respective switch S1, or S2 assigned to the control unit would no longer be activated, with the result that no more energy pulses would be fed to the primer capsule ZP. This would prevent the air bag from being released. This property contrasts, as already mentioned, very advantageously from the devices known from prior art, which no longer offer any possibility to interrupt an already initiated firing operation.

When voltage and energy pulses are supplied to the primer capsule ZP, the voltage drop VM developing on the measuring shunt resistor 22 can be evaluated to determine circuit errors, for example to determine short circuits. For this purpose, the voltage drop VM developing on the measuring shunt resistor 22 is expediently compared to a nominal value, which is stored in one of the control units CU1, CU2 or also in both. The comparison is made according to the following relation:

$$VM(t) = 2UER(t) \cdot \frac{RM}{RINF + RM} \cdot e^{-t/\tau}$$

for all cycles, cycle 1 ... n, after the first triggering cycle, since the voltage value in the first triggering cycle To only amounts to half of the value in the following cycles. In this connection, $$\tau \approx CTOT \ (RINF+RM) \approx CF \ (RINF+RM)$$

applies, whereby it is assumed that $CTOT \approx CF$ (that is $$C1 = C2 >> CF.$$

In this manner, by monitoring the voltage drop VM at the measuring shunt resistor 22, a change in the resistance value RINF of the primer capsule ZP and in the capacitance value of the capacitor ZK can be established independently from each other. Thus, for example, if there is a change in the resistance value RINF of the primer capsule ZP, both the input amplitude of the voltage drop VM and the time constant $\tau$ will change, while a change of the capacitance value of ZK will only affect the time constant $\tau$. The resistance value RM is continuously monitored during the triggering phase by both control units CU1 and CU2.

Deviations from stored nominal values are monitored and evaluated by the control units CU1 and CU2. Different types of short circuits can thereby be recognized in the following specified manner.

A. Short Circuit to Ground at the Circuit Point A

As depicted in FIG. 7c), the voltage drop VINF across the primer capsule ZP = 0 is during the first triggering cycle TO (that is, therefore, before the voltage drop VM across the measuring shunt 22 is measured). In chronologically successive triggering phases $(2n-1)$, $n=1, 2, \ldots, n$ (for example T1, T2 ...), thus when the switches S1, S2 are closed across the terminal connections b, the maximum value of the voltage drop amounts to VINF=UER and the time constant $\tau 1$ is:

$$\tau_1 = \frac{CF \cdot CC}{CF + CC} \cdot RINF \ (C1 = C2 = CC)$$

In the following triggering phases (2n), $n=1, 2, \ldots, n$ (for example T2, T4), when the switches S1, S2 are closed across the contacts a, $$VINF = UER \cdot \frac{RINF}{RINF + RM}$$

applies, and $$\tau_2 = \frac{CF \cdot CC}{CF + CC} \ (RINF + RM)$$

Thus, the following characteristic voltage values are adjusted on the measuring shunt 22 according to FIG. 7d:

For odd triggering phases $(2n - 1)$:
$VM = UER$ and $\tau_3 = CC \cdot RM$

For even triggering phases (2n):
$$VM = UER \cdot \frac{RM}{RINF + RM} \text{ and}$$

$$\tau_2 = \frac{CINF \cdot CC}{1 CINF + CC} \ (RINF + RM)$$

Thus, by measuring the changes in the voltage drop VM, one can establish a short circuit at the circuit point A of the circuit toward ground. The control units CU1, CU2 can then decide, if the tripping operation should be interrupted (the switches S1, S2 would then not be actuated any more) or continued with prolonged triggering phases, in order to compensate for the smaller quantity of energy that can be supplied to the primer capsule ZP due to the short circuit in each triggering phase.

B. Short Circuit to Ground at the Circuit Point B

In this case, an analogous situation arises, as already described before; the error is determined by measuring the voltage drop VM across the measuring shunt 22 with its resistance value RM.

C. Short Circuit of the Circuit Points A or B to the Operating Voltage UB

Each of these cases can be determined by measuring the voltage drop VM across the measuring shunt 22 and by comparing the measured value with a stored nominal value. Even in these cases of fault, however, the primer capsule ZP can always still be triggered, and the required firing energy can be supplied to the primer capsule ZP, because the triggering phases are prolonged accordingly by the control units CU1, CU2.

The present invention is not limited to the previously indicated circuit details. For example, each of the control units CU1, CU2 can be replaced in a further exemplified embodiment by an analog bypass circuit, which can trigger each of the switches S1, S2, whereby it is only possible to trigger each of the switches S1, S2 for a specifiable period of time.

It is also understood that, within the scope of the invention, any number of control circuits and primer capsules can be connected to the energy reserve ER, to trigger if need be a large number of retention means (air bag and/or belt tightener). The number of control lines coupled to the analog-digital converter ADC and to the control units CU1, CU2 would have to be increased accordingly. Each circuit arrangement could of course have more than two switches S1, S2 that can be actuated independently from each other, whereby each switch could receive a switching command from an assigned control unit.

We claim:

1. An electronic device for triggering a safety device, which comprises:
   a sensor for detecting a preselected accident condition and for generating an output signal indicative of the accident condition;
   an evaluation circuit coupled to said sensor for receiving the sensor output signal;
   at least one firing element coupled to said evaluation circuit;
   said evaluation circuit controls triggering of said firing element as a function of the sensor output signal; and
   a capacitor coupled in series to said firing element and having a capacitance value such that the electric charge stored in said capacitor is below the minimum energy amount required to trigger said firing element, wherein said evaluation circuit controls the flow of current through a series of time cycles so that current flow through said firing element during each time cycle supplies a predetermined amount of energy to said firing element that is below a minimum energy amount required to trigger said firing element for triggering said firing element after a predetermined number of time cycles when the cumulative amount of energy supplied to said firing element exceeds said minimum energy amount.

2. The electronic device of claim 1, further comprising:
an electric power supply coupled to said evaluation circuit and to said firing element;
said evaluation circuit operating to control said electric power supply to apply one of a test and triggering current to said firing element.

3. The electronic device of claim 2, wherein said electric power supply comprises a current source and a current sink coupled to one another and operated through the series of time cycles.

4. The electronic device of claim 3, wherein said current source and said current sink are operated in a push-pull operation relative to one another.

5. The electronic device of claim 3, wherein each of said current source and said current sink have a triggering time equal to the predetermined duration of said time cycle.

6. The electronic device of claim 3, wherein the capacitance value of capacitor is less than 10 microfarad.

7. The electronic device of claim 1, wherein the capacitance value of said capacitor is in the range of between approximately 1 to 3 microfarad.

8. The electronic device of claim 1, wherein said firing element and said capacitor are formed in an integral unit.

9. The electronic device of claim 1, wherein said firing element is further coupled to a ground connection.

10. The electronic device of claim 1, wherein said capacitor is further coupled to a ground connection.

11. An electronic device for triggering a safety device, which comprises:
at least one firing element;
a control circuit to control triggering of said firing element;
a circuit arrangement coupling said firing element to said control circuit and being operated through a series of time cycles of predetermined duration so that current flow through said firing element during each time cycle supplies a predetermined amount of energy to said firing element that is below a minimum amount required to trigger said firing element, for triggering said firing element after a predetermined number of time cycles when the cumulative amount of energy supplied to said firing element exceeds said minimum amount;
said circuit arrangement including a plurality of independently actuatable switch elements coupled in series between said firing element and said control circuit;
a plurality of actuators, each actuator coupled to a respective switch element for independently actuating said respective switch element;

a plurality of sensor devices, each sensor device coupled to a respective actuator;
each said sensor device detecting a preselected accident condition and generating an output signal indicative of the accident condition for input to said respective actuator;
each said actuator independently controlling said respective switch element as a function of the output signal of a respective sensor device.

12. The electronic device of claim 11, wherein one of said switch elements is periodically actuated, once per time cycle.

13. The electronic device of claim 11, further comprising a capacitor coupled in series to said firing element.

14. The electronic device of claim 13, wherein said capacitor has a capacitance value such that the electric charge stored in said capacitor is below the minimum energy amount required to trigger said firing element.

15. The electronic device of claim 11, further comprising means for measuring predetermined electrical values within said electronic device when said firing element is coupled to said control circuit by said circuit arrangement.

16. The electronic device of claim 15, further comprising:
means for storing nominal values corresponding to the predetermined electrical values; and
means for comparing the predetermined electrical values to the nominal values to monitor operation of said electronic device.

17. The electronic device of claim 11, wherein said control circuit includes a reserve energy source.

18. The electronic device of claim 17, wherein said reserve energy source comprises a second capacitor.

19. The electronic device of claim 11, wherein each of said actuators includes a respective switch control device, each switch control device being coupled to a respective switch element to independently control said respective switch element.

20. An electronic device for triggering a safety device, which comprises:
a firing element; and
a control circuit including two current sources coupled to said firing element and operated in a push-pull operation to control triggering of said firing element through a series of time cycles of predetermined duration so that current flow through said firing element during each time cycle supplies a predetermined amount of energy to said firing element that is below a minimum amount required to trigger said firing element for triggering said firing element after a predetermined number of time cycles when the cumulative amount of energy supplied to said firing element exceeds said minimum amount.

21. The electronic device of either one of claims 1, 11 or 20 wherein said firing element comprises a primer capsule.

22. A method for operating an electronic device including a firing element and a control circuit coupled to the firing element to trigger the firing element, the method comprising the steps of:
operating the control circuit to supply electrical energy to the firing element by operating two controllable current sources in a push-pull operation; and supplying said electrical energy to the firing element through a series of time cycles of predetermined duration so that current flow through the firing element during each cycle provides a predetermined amount of energy to the firing element that is below a minimum amount required to trigger the firing element for triggering the firing element after a predetermined number of time cycles when the cumulative amount of energy supplied to said firing element exceeds said minimum amount.

23. The method of claim 22, comprising the further step of operating the two current sources to shut down the firing element.

24. The method of claim 22, comprising the further steps of:
   detecting an error condition during the step of supplying said electrical energy to the firing element; and
   interrupting the step of supplying said electrical energy to the firing element upon detection of said error condition.

25. An electronic device for triggering a safety device, which comprises:
   a sensor for detecting an accident condition and for generating an output signal indicative of the accident condition;
   a firing element coupled to a safety device for activating the safety device upon triggering of the firing element in response to the sensor output signal; and
   a current source and a current sink coupled to the firing element and operated in a push-pull operation relative to one another through a series of cycles so that current flow through the firing element during each cycle supplies an amount of energy to the firing element that is below a minimum energy amount required to trigger the firing element.

26. The electronic device of claim 25, wherein each cycle is a time cycle of predetermined duration, and the firing element is triggered after a predetermined number of time cycles when the cumulative amount of energy supplied to the firing element exceeds the minimum energy amount required to trigger the firing element.

27. The electronic device of claim 25, further comprising:
   an evaluation circuit coupled to the sensor and to the firing element for controlling triggering of the firing element as a function of the sensor output signal.

28. The electronic device of claim 25, further comprising:
   a capacitor coupled in series to the firing element and having a capacitance wherein the electric charge stored in the capacitor is less than the minimum energy amount required to trigger the firing element.

29. The electronic device of claim 27, wherein the evaluation circuit operates to control the current source and current sink to apply one of a test and triggering current to the firing element.

30. The electronic device of claim 26, wherein each of the current source and the current sink have a triggering time equal to the predetermined duration of the time cycle.

* * * * *

UNITED STATES PATENT AND TRADEMARK OFFICE
CERTIFICATE OF CORRECTION

PATENT NO. : 5,146,104

DATED : September 8, 1992

INVENTOR(S) : Schumacher et al.

It is certified that error appears in the above-identified patent and that said Letters Patent is hereby corrected as shown below:

Column 9, line 56, change "$\int$" to --$\Delta E = \int$--.

Column 10, line 41, change "and CU1" to --and CU2--.

Column 11, line 27, change "$_T$will" to --$_T$ will--.

Column 12, line 7, change "1CINF" to --CINF--.

Signed and Sealed this

Twenty-ninth Day of March, 1994

Attest:

BRUCE LEHMAN

*Attesting Officer*   Commissioner of Patents and Trademarks